July 25, 1950 C. W. BERTHIEZ 2,516,294
MACHINE FOR SURFACING VERY BROAD MEMBERS
Filed Oct. 12, 1945 4 Sheets-Sheet 1
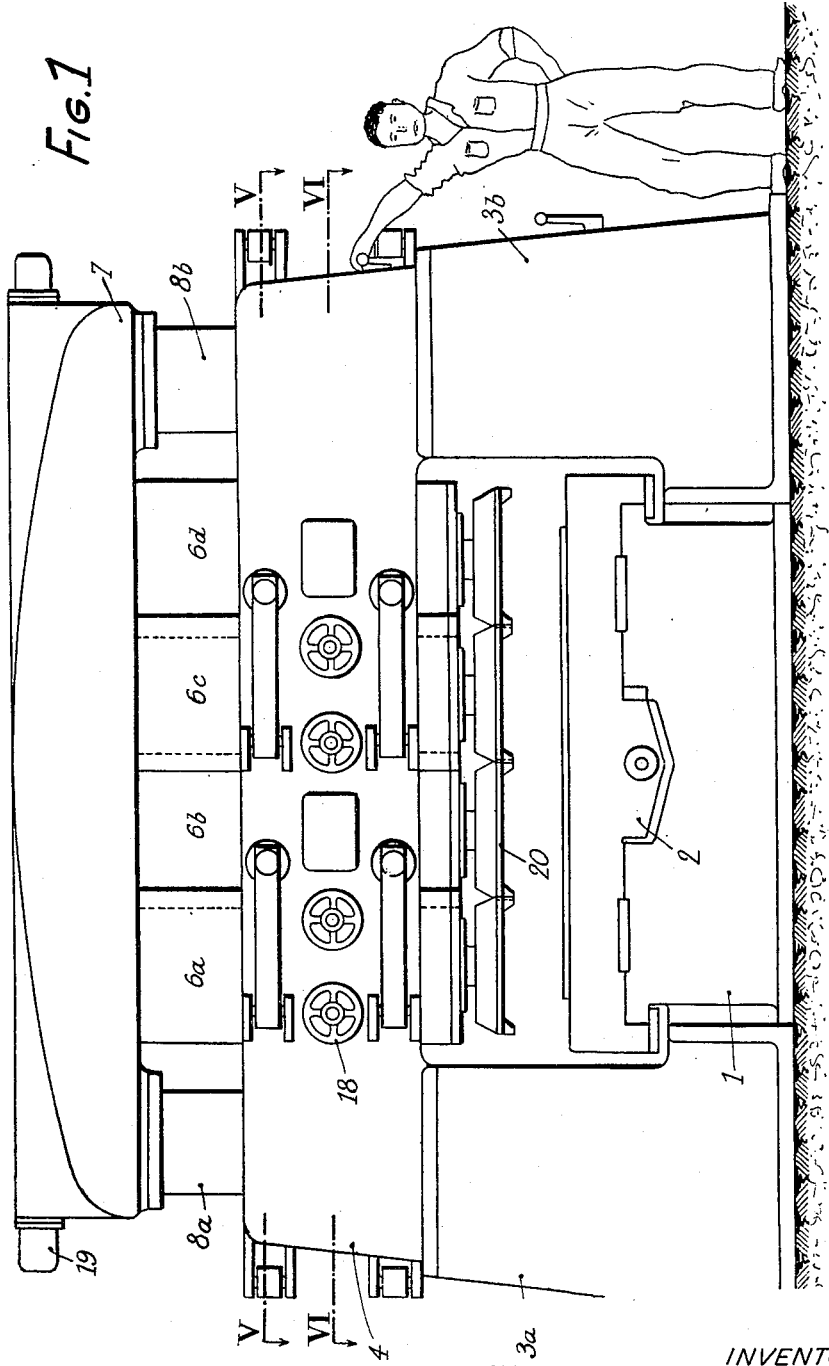
INVENTOR
CHARLES WILLIAM BERTHIEZ
BY George H. Corey
ATTORNEY

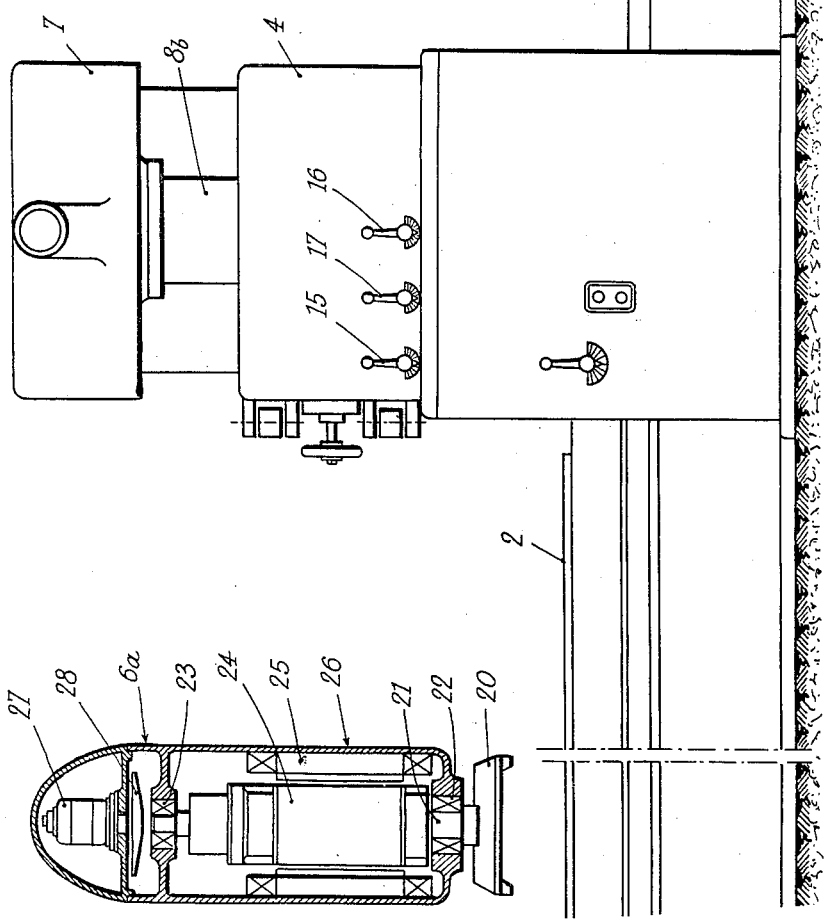

July 25, 1950  C. W. BERTHIEZ  2,516,294
MACHINE FOR SURFACING VERY BROAD MEMBERS
Filed Oct. 12, 1945  4 Sheets-Sheet 3
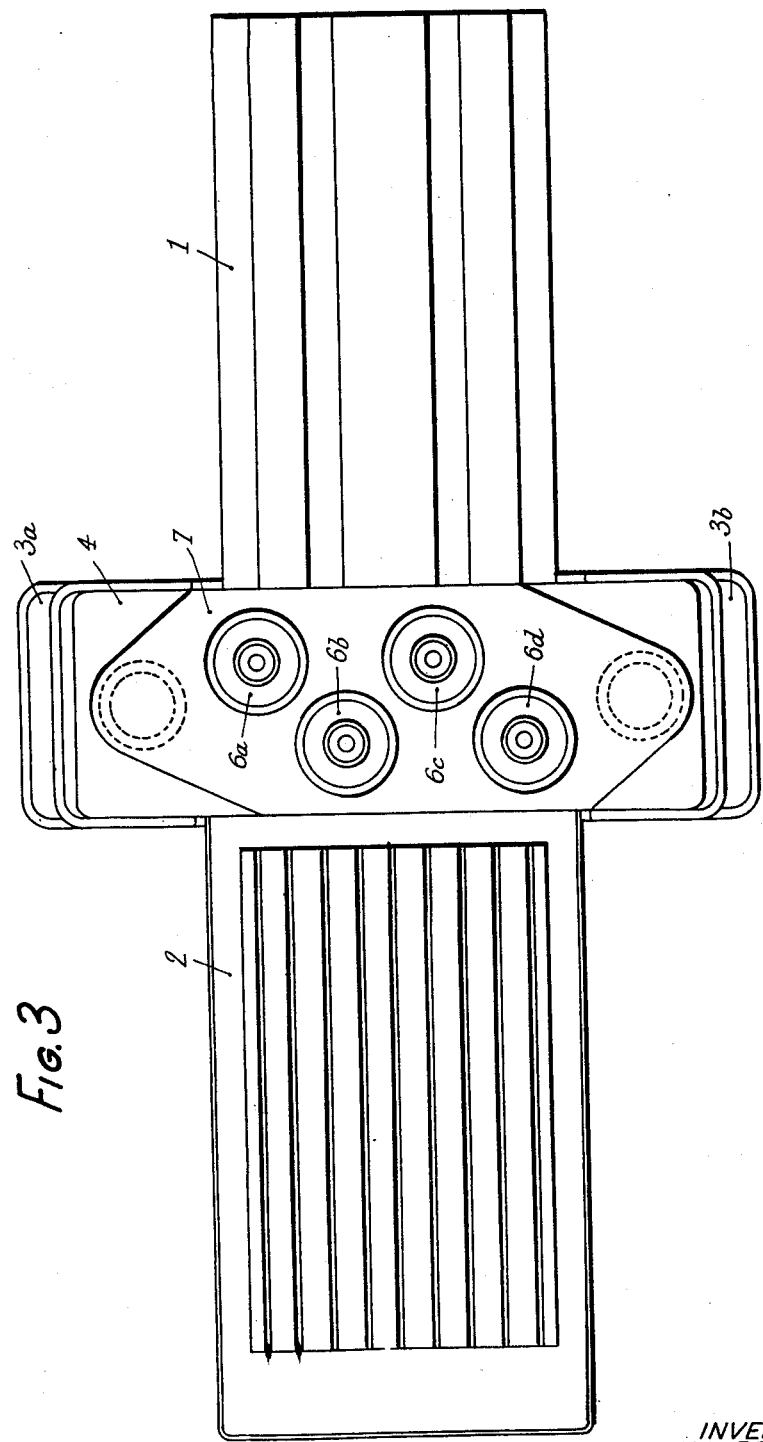
INVENTOR
CHARLES WILLIAM BERTHIEZ
BY George N. Covey
ATTORNEY July 25, 1950        C. W. BERTHIEZ        2,516,294
MACHINE FOR SURFACING VERY BROAD MEMBERS
Filed Oct. 12, 1945        4 Sheets-Sheet 4
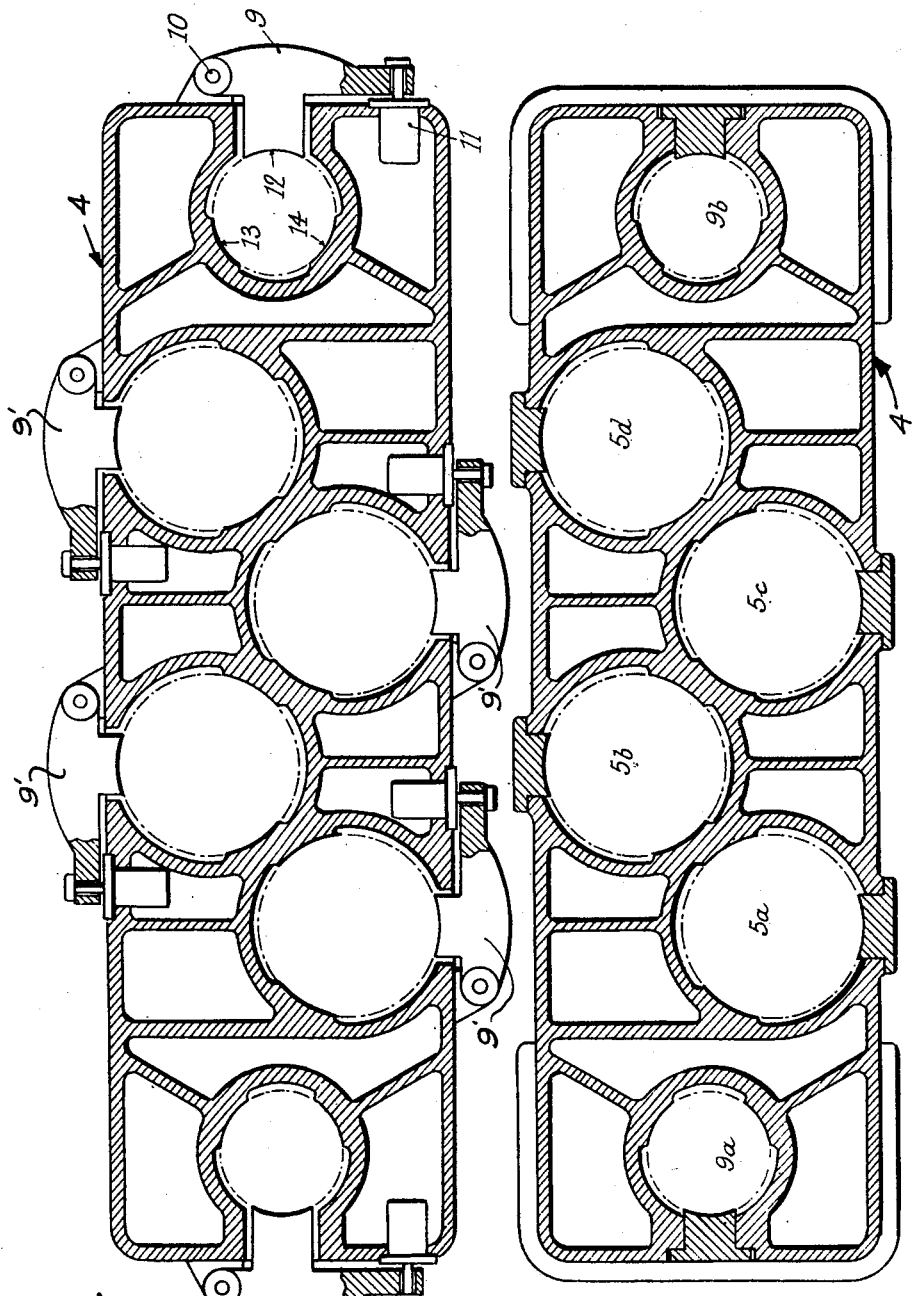
INVENTOR
CHARLES WILLIAM BERTHIEZ
BY George H. Corey
ATTORNEY Patented July 25, 1950

2,516,294

UNITED STATES PATENT OFFICE 2,516,294

MACHINE FOR SURFACING VERY BROAD MEMBERS

Charles William Berthiez, Paris, France

Application October 12, 1945, Serial No. 622,036
In France March 8, 1945

12 Claims. (Cl. 90—16)

My invention has for its object an improved machine tool adapted to surface very broad parts and in particular blocks of metal before and after their passage through the blooming rolling mill in rolling plants and also plates of light metal, any alloys, such as aluminium, aluminium alloys known under the name of Duralumin and the like. Heretofore this surfacing was executed on a planing machine or on a milling machine, such as a milling and planing machine, through a succession of cuts. Such an operation on a planer is not an economical one as the best planing machines on the market allow only cutting speeds of 100 meters per minute whereas aluminium may be machined at cutting speeds as high as 1500 meters per minute.

In the present state of the art it is not possible to provide planing machines operating even at cutting speeds of 300 meters per minute.

Operation on a milling machine of the milling and planing machine type operating through a succession of cuts, although of a much higher efficiency than the planing operation, is not economical. As a matter of fact for surfacing for instance a plate two meters broad with a cutter the diameter of which is about 550 mm., it is necessary to execute four cuts. But if it were possible to mount four cutters the diameter of which is 550 mm. in suitable positions on the same machine, the operation could be executed at a speed four times greater. The machine forming the object of the present invention has for its object to solve this problem.

The machine covers also a specific application of the method and means described in my copending U. S. application Serial No. 620,604, filed October 5, 1945, and now abandoned.

According to a first characteristic feature of my invention the machine includes a stationary horizontal cross-beam underneath which the work-carrying table is adapted to move, said beam including recesses within which may slide on the one hand operating units constituted each by a tool and its control motor and the other hand supporting columns for a movable cross member carrying the above mentioned operating units.

According to a further feature of my invention the above mentioned operating units may on the one hand be adjusted separately with reference to one another on the movable cross-member and on the other hand they may be moved as a unit rigid with said movable cross-member.

Other features of the invention will appear in the reading of the following description of an embodiment of my invention chosen by way of example and illustrated diagrammatically in accompanying drawing.

In said drawing:

Fig. 1 is a view in elevation of a machine embodying my invention.

Fig. 2 is a side elevation as viewed from the right in Fig. 1.

Fig. 3 is a plan view of the machine of Fig. 1.

Fig. 4 is a cross-sectional view of an operating unit adapted for use in such a machine.

Figs. 5 and 6 are cross sectional views taken respectively on lines V—V and VI—VI of Fig. 1.

The machine executed in conformity with my invention and as illustrated in accompanying drawings comprises a bed 1 adapted to carry a table 2 and to guide it during its displacements to and fro on said bed. Said table 2 carrying the work may slide longitudinally over the bed 1 by virtue of the usual means for guiding and driving used in most standard machine tools, such as guiding upon square, V-shaped, dovetailed strips etc., driving through pinion and rack, leading screw and nut, through hydraulic, electrical and the like devices, etc.

At each side of the bed 1 are arranged two uprights 3a and 3b rigid with said bed and adapted to carry a horizontal cross-beam 4 rigidly secured to the upper end of the uprights 3a and 3b.

This structure including the bed, uprights and cross-beam forms a unit provided with a very high rigidity and capable of resisting under extreme conditions the vertical and horizontal forces and their components produced by operation.

The horizontal cross-beam 4 is provided with a plurality of cylindrical recesses 5a, 5b, 5c, 5d, in Fig. 6, adapted to guide a corresponding number of operating units 6a, 6b, 6c, 6d, Figs. 1 and 3. The operating units may slide within the recesses thus provided through the cross-beam 4. To this end they may be secured in a movable cross member 7 which is carried by two columns 8a, 8b, sliding within two cylindrical bores 9a, 9b, Fig. 6, provided in the stationary cross-beam 4. The units 6a, 6b, 6c, 6d also may be slidably movable in the movable cross-member 7 for the purpose of adjusting the individual units vertically to bring the cutters driven thereby into the same plane or into proper working relation to each other and with respect to the work piece. In these adjusted positions they may be locked by means hereafter described to provide for moving all of the units as a rigid whole together with the cross beam 7. This arrangement forms one of the main features of the present invention.

The columns 8a and 8b, and the operating units 6a, 6b, 6c, 6d may be rigidly fastened in the stationary cross-beam 4, after being slidably moved to a desired position, by means of suitable locking members. The omission of said locking means would, however, not change the general arrangement according to my invention, as such locking means may serve merely for removing the play due to an insufficiently accurate machining of the sliding recesses.

Nevertheless, I will disclose now by way of example a possible form of such locking means.

A lever 9 may rock upon a stud 10 under the control of an electromagnet 11, these parts being carried by the cross beam 4. When the electromagnet is energized, it causes the shoe 12 of the lever 9 to bear strongly against the part to be locked, in the present instance the column 8a or 8b, which latter transmits the pressure to the bearing surfaces 13 and 14. These locking means may be controlled by a suitable lever 15 for actuating means to energize or deenergize said electromagnets 11. Similar devices having levers 9' may be provided for locking the units 6a, 6b, 6c, 6d in the cross beam 4.

Similar locking devices (not shown) controlled by a lever 16 may also be used for locking the operating units 6a, 6b, 6c, 6d to the movable cross-beam 7.

Lastly such locking means may be used for the columns 8a and 8b carrying the cross-beam 7, said locking means being controlled in a similar manner by a suitable lever 17 so as to lock the cross-beam 7 in its adjusted position.

When the columns 8a, 8b, thus have been rigidly fastened in the cross-beam 4, it is possible to unlock the operative units with reference both to the stationary cross-beam 4 and to the movable cross-beam 7, by means for instance of the levers 15 and 16, and to raise or to lower through the hand-wheel 18 the operating units one with reference to the other so as to bring the operating tools into a same plane or in different positions with reference to one another as required by the operation to be effected.

When the operating units have been made rigid with the movable cross-beam 7 and are free to slide, together with the columns 8a, 8b, in the stationary cross-beam 4, it is possible by means of the control device 19 to move vertically and simultaneously the system of four operating units with reference to the plane of the table 2 in conformity with a further important feature of my invention.

In Fig. 4, I have shown by way of example one embodiment of the operating units 6a, 6b, 6c, 6d. In this example, 20 designates the tool which it is desired to move in a rotary motion. To this end it is fastened on a shaft 21 the lower end of which is carried by a bearing 22 the upper end being journalled in bearing 23. The shaft carries the rotor of an electric motor the stator of which is shown at 25 and the frame at 26. At the upper end of the unit driving motor 27 is supported for driving the cooling fan 28.

These operating units 6a, 6b, 6c, 6d may however be constructed in any other suitable manner without changing thereby the scope of the present invention. They may be of the individually controlled mechanical type or may be controlled simultaneously by a single shaft or they may be driven by a belt running on a pulley keyed to the end of the shaft.

Similiarly it is possible without changing the scope of the invention to replace the control electromagnet 11 for locking the operative units as illustrated in Fig. 5 by a mechanical or hydraulic device or else by an electric motor or any other suitable control device effective to grip the units or the columns 8a, 8b.

In the same manner, it is possible to execute the locking means in a manner different from that disclosed by way of example in Figs. 5 and 6. Thus I may use locking means comprising a longitudinal wedge, conical rings, pinching means and the like.

Moreover other modifications may be made in the details of the structure of the machine described hereinabove and illustrated in the drawing without the general principle of my invention being modified thereby. Thus, inter alia, the shape of the columns 8a, 8b and of the operating units 6a, 6b, 6c, 6d may, instead of being cylindrical, assume a different shape such, for instance, as a prismatic shape with any desired number of lateral surfaces. It is also possible to modify the number of operating units incorporated in the machines, which number may be different from that of the embodiment shown and described by way of example.

It will be understood that the cutter 20 may be replaced, depending upon the work to be executed, by any other suitable tool.

What I claim is:

1. In a machine tool or the like, the combination with a stationary horizontal cross-beam provided with vertical recesses, and a work-carrying table adapted to move beneath said horizontal cross beam, of a plurality of operating units each comprising a tool and a motor for driving the tool, said units being adapted to slide vertically respectively within said recesses, a vertically movable cross beam supporting said operating units, and columns supporting the movable cross beam for vertical movement thereof.

2. In a machine tool or the like, the combination with a stationary horizontal cross-beam provided with vertical recesses, and a work-carrying table adapted to move beneath said horizontal cross beam, of a plurality of operating units each comprising a tool and a motor for driving the tool, said units being adapted to slide vertically respectively within said recesses, a vertically movable cross beam supporting said operating units, and columns supporting the movable cross beam for vertical movement thereof, means for adjusting individually the different operating units vertically with reference to the movable cross beam, and means for moving vertically as a rigid member said movable cross-beam and said operating units carried thereby.

3. In a machine tool or the like, the combination with a stationary horizontal cross-beam provided with vertical recesses, and a work-carrying table adapted to move beneath said horizontal cross-beam, of a plurality of operating units each comprising a tool and a motor for driving the tool, said units being adapted to slide vertically respectively within said recesses, a vertically movable cross-beam supporting said operating units, means for locking the operating units to the movable cross-beam, and columns supporting the movable cross-beam for vertical movement thereof.

4. In a machine tool or the like, the combination with a stationary horizontal cross-beam provided with vertical recesses, and a work-carrying table adapted to move beneath said horizontal cross-beam, of a plurality of tool carrying units adapted to slide vertically respectively within said recesses, a vertically movable cross-beam carrying said tool carrying units, columns supporting the movable cross-beam for vertical movement thereof, and means for locking the operating units and the columns carrying the movable cross-beam to the stationary cross-beam.

5. In a machine tool or the like, the combination with a stationary horizontal cross-beam provided with two series of recesses, and a work-carrying table adapted to move beneath said horizontal cross-beam, of a plurality of operating units each comprising a tool and a motor for driving the tool, said units being adapted to slide vertically respectively within the recesses of one of said two series of recesses, a vertically movable cross-beam carrying said operating units, and columns supporting the movable cross-beam and adapted to slide vertically within the recesses of the other of said two series of recesses.

6. In a machine tool or the like, the combination with a work carrying table supported for reciprocating movement thereof in a direction parallel to the work carrying surface of said table, and a stationary beam member supported to span across said table in spaced relation to said surface thereof, of columnar members supported by said stationary beam member, a movable beam member supported by said columnar members for movement thereof transversely of said table surface, and a tool carrying unit slidably supported in both said beam members for movement transversely of said table surface.

7. In a machine tool or the like, the combination as defined in claim 6 which comprises locking means for locking said beam members, said columnar members and said unit against movement from positions in which they are adjusted with respect to each other.

8. In a machine tool or the like, the combination with a work carrying table supported for reciprocating movement thereof in a direction parallel to the work carrying surface of said table, and a stationary beam member supported to span across said table in spaced relation to said surface thereof, of columnar members supported by said stationary beam member for sliding movement thereof relative to said stationary beam member transversely of the table surface, a movable beam member supported by said columnar members so as to be slidably adjustable together with said columnar members transversely of said table surface, and a tool carrying unit supported by said movable beam member so as to be slidably adjustable relative thereto transversely of said table surface.

9. In a machine tool or the like, the combination as defined in claim 8 in which said tool carrying unit is slidably and adjustably supported by said stationary beam member.

10. In a machine tool or the like, the combination with a stationary horizontal cross beam provided with vertical recesses arranged in staggered formation, a work carrying table adapted to move beneath said horizontal cross beam, of a plurality of operating units each comprising a tool and a motor for driving the tool, said units being adapted to slide vertically respectively within said recesses, a vertically movable cross beam supporting said operating units in said staggered relation corresponding to that of said recesses, and columns supporting the movable cross beam for vertical movement thereof.

11. In a machine tool or the like, the combination with a work carrying table supported for reciprocating movement thereof in a direction parallel to the work carrying surface of the table, and a stationary beam member supported to span across said table in spaced relation to said surface thereof, of a columnar member supported by said stationary beam member, a movable beam member supported by said columnar member, and a tool carrying unit supported by said beam members, said beam members and said columnar member cooperating to support said tool carrying unit so as to provide for movement of said unit transversely of said table surface.

12. In a machine tool or the like, the combination as defined in claim 11 which comprises means for locking said movable beam member against movement thereof transversely of said table surface, and means for locking said tool carrying unit against movement thereof transversely of said table surface.

CHARLES WILLIAM BERTHIEZ.

REFERENCES CITED

The following references are of record in the file of this patent:

UNITED STATES PATENTS

| Number | Name | Date |
| --- | --- | --- |
| 1,021,430 | Shanks | Mar. 26, 1912 |
| 1,208,852 | Sproul | Dec. 19, 1916 |
| 1,838,816 | Fickett et al. | Dec. 29, 1931 |

FOREIGN PATENTS

| Number | Country | Date |
| --- | --- | --- |
| 12,076 | Great Britain | Aug. 19, 1889 |
| 351,852 | Great Britain | July 2, 1931 |